Patented Nov. 13, 1928.

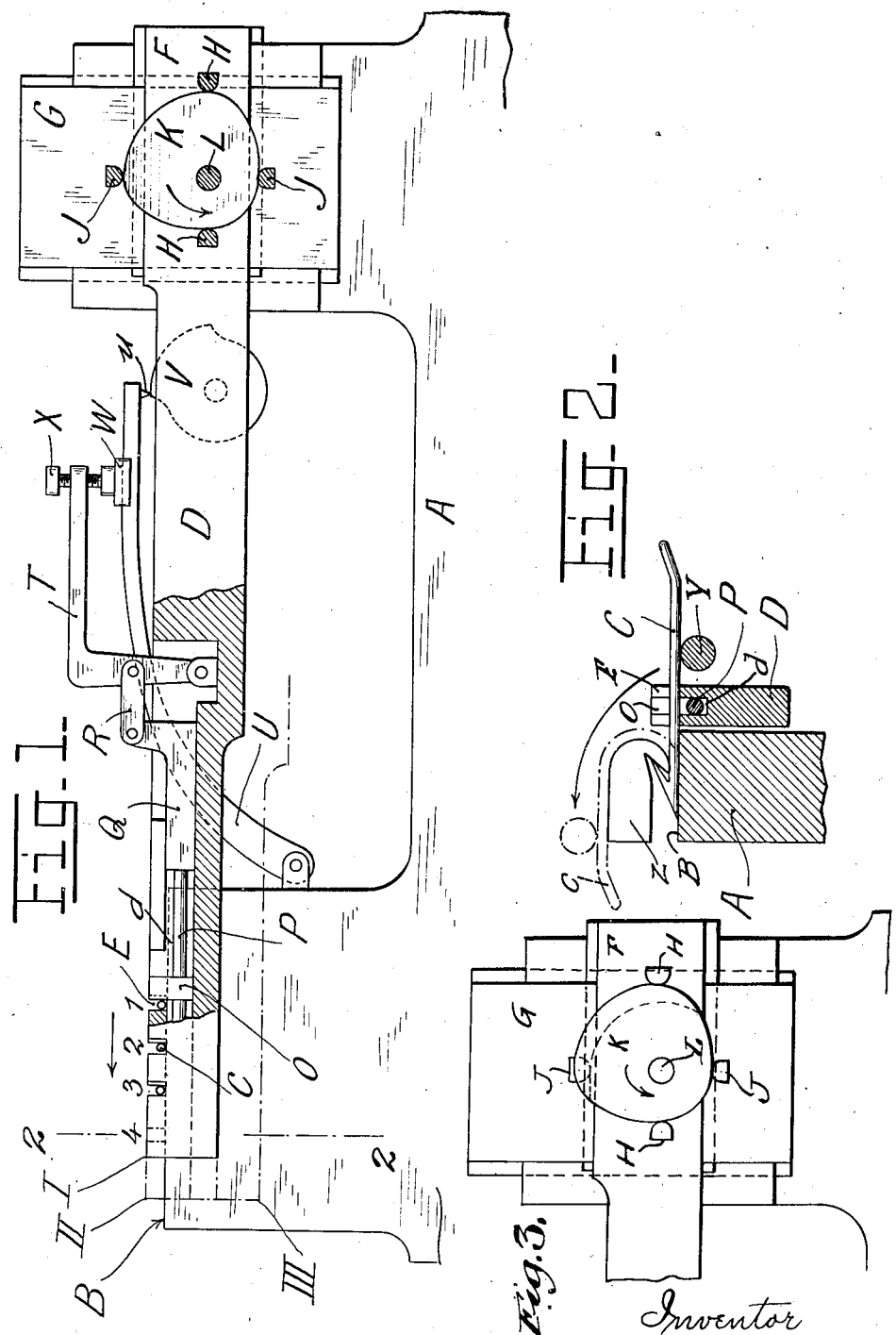

1,691,534

UNITED STATES PATENT OFFICE.

MATHIAS TOPP, OF GJOVIK, NORWAY, ASSIGNOR TO O. MUSTAD & SON, OF OSLO, NORWAY.

MACHINE FOR THE MANUFACTURE OF FISHHOOKS.

Application filed January 21, 1926, Serial No. 82,820, and in Germany January 24, 1925.

This invention relates to mechanism for holding and transporting blanks in a machine for manufacturing fish hooks, said machine operating automatically, taking in the material in the form of a continuous wire from a drum, cutting it up into pieces of suitable lengths and after repeated treatments delivering wholly finished fish hooks at the other end of the machine.

The operation of a machine performing this work involves certain difficulties, it being important that the repeated treatments of one or both ends of the blank, the clamping of the same during the work and during the transport from one working place to another and also this transport itself can be effected in an absolutely perfect manner, so that the blank can not alter its position by vibrations of the machine or by the influence of gravity and so that the blanks enter into exactly the same position in relation to each separate working tool.

According to the invention the working tools are arranged at equal distances at one or both sides of a transporting device, which performs a reciprocating motion, the said transporting device co-operating with clamping means for the blanks arranged in such a manner that they firmly clamp the blank or blanks during the motion from one working place to another but release the blanks when this motion ceases and when the holder members, which have to clamp the blanks during the working period, are entering into operation.

In order to illustrate the operation of a machine according to the invention, the drawing shows diagrammatically an embodiment of the transporting and holding devices.

Fig. 1 shows the arrangement from the side partly in section. Fig. 2 is a section on the line 2—2 of Fig 1. Fig. 3 is a detail side view showing a modification of the actuating mechanism of the feed device.

In the illustrated example, a machine stand A is provided with a plane horizontal working surface B constituting a series of working positions arranged in the same plane for supporting the blanks C and upon which surface the blanks are firmly pressed during the operation, the blanks being fed along the surface in the direction of the arrow between the working steps. The member D effects this feeding from one working place to another and for this purpose it is provided with transverse notches or grooves E at distances corresponding to the distance between the working tools. This feeding device consequently must perform an exactly rectilinear motion in the direction indicated by the arrow and also a return motion so arranged that the feeding device when free of the blanks is lowered without disturbing the position of the latter and at the end of the return motion is again raised into the normal position in order to clamp the blanks anew. The complete cycle of motions of the feeding device may preferably be composed of a rectilinear forward motion, a succeeding vertical motion downwards, a horizontal backward motion and a vertical motion upwards.

In order to explain the operation of the device in the simplest possible manner, the moving mechanism of the feeding device is shown in the drawing as consisting of slides F, G movable perpendicularly to one another and the first of which is fixedly connected with the feeding device D and may be moved in horizontal guides in the second slide G which in turn may be moved in vertical guides on the machine frame. Each of these slides carries projections or rolls H H, J, J respectively arranged in pairs and engaging a cam disc K on the shaft L. This cam disc is of such a shape that eccentrically arranged parts of its curve operate the projections H H and J, J alternately. In the position shown and with the moving direction indicated by the arrow the cam disc during the following quarter of a revolution will move the feeding device rectilinearly forward from the position I into the dotted position II. From this position into the position III, then back exactly beneath the position I and thereupon again into this position. If a single cam disc is employed, as shown in Fig. 1 for both slides, the vertical and the horizontal motion will be of equal amplitude. As it is preferable in practise to have a comparatively small vertical and a greater horizontal motion this may obviously be obtained easily by each slide being driven from a separate disc as shown in Fig. 3.

During the feeding along the plane working surface B the blanks must be immovably held in the feeding device. One wall of each transverse groove E therefore is in the form of an adjustable jaw which at the suitable time presses the blank firmly against the other wall and later on again at the correct moment, releases it. In order to obtain this result in a perfect manner a longitudinally movable bar is placed in the feeding device and carries these jaws, the bar being adjusted corresponding to the motion of the feeding device.

This opening and closing of the blank holders may take place in the following manner: In a longitudinal groove $d$, formed in the feeding device sliding pieces O are inserted which are interconnected by a rod P extending from a slide Q arranged in the rear part of the groove. The slide Q is connected by a link R with a lever T. Pivoted to the machine frame is an arm U having a lug $u$ resting upon a cam disc V. The upper side of this arm forms a support for the sliding piece W, against which the lever T rests by means of an adjusting screw X. During the rotation of the cam disc the arm U is raised and lowered, and this movement is transmitted to the lever T, whereby the link R imparts to the slide Q a reciprocating motion. Owing to the sliding connection between the arm U and the lever T this reciprocating motion of the slide Q may take place independently of the reciprocating motion of the feeding device.

The mechanism obviously must be so adjusted that the upper side of the arm U is parallel to the longitudinal axis of the feeding device, when the arm occupies its highest position.

In a machine for the manufacture of fish hooks by the use of a feeding device described above, the blank wire is inserted into the blank holder No. 1 while the feeding device occupies the position I, and in this position the wire is cut in a correct length by any suitable cutter (not shown). The cut blank then is treated successively at the working places 1, 2 and 3, it being moved one step further after each treatment. When it arrives at the working place 4, only the bending of the hook remains. The finished point is held firmly on the working surface B the other end of the hook is raised and is bent by a member Y towards the point around a mould $z$ (see Figure 2). Thus the hook now finished is simultaneously brought out from the path of the feeding device, so that nothing prevents the latter from performing anew its cycle.

Claims:

1. In a machine for making fish hooks, a horizontal work surface for supporting the hook blanks, a blank feeder extending along one side of said surface and having notches therein for the reception of the blanks, means in the feeder for clamping the blanks in the notches, means to impart to the feeder a reciprocating motion in rectilinear directions comprising a slide in which said feeder is mounted, and means to move the feeder horizontally in the slide and to move the latter vertically between the movements of the feeder.

2. In a machine for making fish hooks, a horizontal work surface for supporting the hook blanks, a blank feeder extending along one side of the surface and having notches therein for the reception of the blanks, a series of clamping members movable longitudinally in the feeder for holding the blanks in the notches, means to impart to the feeder a reciprocating motion in rectilinear directions comprising a slide in which said feeder is mounted, and means to move the feeder horizontally in the slide and to move the latter vertically between the movements of the feeder.

3. In a machine for making fish hooks, a horizontal work surface for supporting the hook blanks, a feed bar extending along one side of said surface and having transverse notches therein for the reception of the blanks, a plurality of movable jaws mounted in the bar and co-operating with the walls of the notches to form a series of clamps for the blanks and means to reciprocate the feed bar horizontally, and means to move said bar vertically between its horizontal movements.

4. In a machine for making fish hooks, a horizontal work surface for supporting the hook blanks, a horizontal feed-bar extending along one side of said surface and having a series of transverse notches for the reception of the blanks, a longitudinal channel in said bar, a plurality of blocks movably mounted in said channel and co-operating with the sides of the notches to form a series of clamps for the blanks, a rod connecting the blocks, means for reciprocating the blocks relatively to the notches, and means to impart to the feed bar, a reciprocating motion in rectilinear directions.

5. In a machine for making fish hooks, a horizontal work surface for supporting the hook blanks, a horizontal feed-bar extending along one side of the surface and having a plurality of transverse notches for the reception of the blanks, a longitudinal channel in said bar, a plurality of blocks mounted in the channel, movable into and out of the notches and co-operating with the walls of the latter to clamp the blanks therein, a rod connecting the blocks, means to impart to the feed-bar a reciprocating motion in rectilinear directions, and means to reciprocate the blocks relatively to the notches and independently of the movement of the bar.

6. In a machine for making fish-hooks, a horizontal work surface for supporting the hook blanks, a horizontal feed bar for the blanks extending along one side of the surface, a plurality of separate clamping jaws to engage the blanks mounted in said bar, means to reciprocate the latter horizontally, means to move it vertically between the horizontal movements, and means to actuate the clamping jaws independently of the movement of the feed-bar.

7. In a machine for making fish hooks, a horizontal work surface for supporting the hook blanks, a horizontal feed-bar extending along one side of the surface and having a plurality of notches for the reception of the blanks, a block movable into each notch and co-operating with one wall of the latter to clamp a blank, a rod mounted in the feed bar connecting the blocks, a slide on the bar, a cam actuated lever mechanism for reciprocating the slide, and means to impart to the feed-bar a reciprocating motion in rectilinear directions.

8. In a machine for making fish hooks, a frame, a horizontal work surface on the frame for supporting the hook blanks, a vertically reciprocal slide mounted on the frame, a horizontal feed-bar reciprocally mounted in the slide and extending along one side of the supporting surface, said bar having a plurality of transverse notches for the reception of the blanks, movable jaws mounted in the feed bar, means for moving the jaws into and out of the notches for clamping and releasing the blanks therein, lugs on feed-bar and slide, and a rotary cam arranged to successively engage the lugs whereby the feed-bar and slide are alternately reciprocated.

9. In a machine for making fish hooks, a frame, a horizontal work surface on the frame for supporting the hook-blanks, a vertically reciprocal supporting slide mounted on the frame, a horizontal feed-bar extending along one side of the supporting surface and reciprocally mounted in said slide, said bar having a plurality of transverse notches in its upper edge for the reception of the blanks, a longitudinal groove in said bar communicating with the notches, clamping blocks mounted in the groove movable into and out of the notches, a rod connecting the blocks, a bell-crank lever connected with the connecting rod, a cam-actuated member for oscillating the lever to reciprocate the connecting rod, and means to alternately move the supporting slide and feed bar.

10. In a machine for making fish hooks, a frame, a horizontal work surface on the frame for supporting the hook blanks, a vertically reciprocal supporting slide mounted on the frame, a horizontal feed-bar extending along one side of the supporting surface and reciprocally mounted in said slide, said bar having a plurality of transverse notches in its upper edge for the reception of the blanks, a longitudinal groove in said bar communicating with the notches, clamping blocks mounted in the groove movable into and out of the notches, a rod connecting the blocks, a bell-crank lever connected with the connecting rod, a cam-actuated member for oscillating the lever to reciprocate the connecting rod, lugs on the slide and feed-bar, and a rotary cam engaging the lugs whereby a reciprocating motion in rectilinear directions is imparted to the feed bar.

In testimony that I claim the foregoing as my invention, I have signed my name.

MATHIAS TOPP.